United States Patent [19]

Fontana, Jr. et al.

[11] Patent Number: 5,454,158

[45] Date of Patent: Oct. 3, 1995

[54] METHOD OF MAKING INTEGRAL TRANSDUCER-SUSPENSION ASSEMBLIES FOR LONGITUDINAL RECORDING

[75] Inventors: Robert E. Fontana, Jr.; David A. Thompson; Mason L. Williams, III; Celia E. Yeack-Scranton, all of San Jose, Calif.

[73] Assignee: International Business Machines Corporation, Armonk, N.Y.

[21] Appl. No.: 270,104

[22] Filed: Jul. 1, 1994

Related U.S. Application Data

[63] Continuation of Ser. No. 2,290, Jan. 8, 1993, abandoned.

[51] Int. Cl.⁶ ........................................................ G11B 5/42
[52] U.S. Cl. ............................ 29/603; 360/104; 360/122
[58] Field of Search .................................. 360/103, 104, 360/110, 119, 122; 29/603; 427/131, 132

[56] References Cited

U.S. PATENT DOCUMENTS

| | | | |
|---|---|---|---|
| 3,775,571 | 11/1973 | Case et al. | 360/122 |
| 3,849,800 | 11/1974 | Cuzner et al. | 360/97 |
| 4,167,765 | 9/1979 | Watrous | 360/103 |
| 4,190,872 | 2/1980 | Jones, Jr. et al. | 360/125 |
| 4,251,841 | 2/1981 | Jacobs | 360/122 |
| 4,624,048 | 11/1986 | Hinkel et al. | 29/603 |
| 4,642,716 | 2/1987 | Wakabayashi et al. | 360/104 |
| 4,951,166 | 8/1990 | Schewe | 360/119 |
| 4,953,050 | 8/1990 | Kumura et al. | 360/126 |
| 4,996,616 | 2/1991 | Aoyagi et al. | 360/104 |
| 5,041,932 | 8/1991 | Hamilton | 360/104 |
| 5,065,271 | 11/1991 | Matsuura et al. | 360/104 |
| 5,073,242 | 12/1991 | Hamilton | 204/192.22 |
| 5,109,311 | 4/1992 | Hanazono et al. | 360/110 |
| 5,111,351 | 5/1992 | Hamilton | 360/104 |
| 5,126,903 | 6/1992 | Matsuzaki | 360/104 |
| 5,166,845 | 11/1992 | Thompson et al. | 360/104 |

FOREIGN PATENT DOCUMENTS

| | | | |
|---|---|---|---|
| 56-74812 | 6/1981 | Japan | 360/104 |
| 59-213066 | 12/1984 | Japan | 360/104 |
| 4-289508 | 10/1992 | Japan . | |

OTHER PUBLICATIONS

Beaulieu et al., "Vertical Recording Probe Head Made by Horizontal Head Process," IBM TDB, vol. 36, No. 02, Feb. 1993, pp. 267–268.

Lazzari et al., "A New Thin Film Head Generation IC Head," IEEE Trans. Mag., vol. 25, No. 5, Sep., 1989, pp. 3190–3193.

Chapman, "A New Approach to Making Thin Film Head–Slider Devices," IEEE Trans. on Mag., vol. 25, No. 5, Sep., 1989, pp. 3686–3688.

Chapman et al., "A New, Horizontal MR Head Structure," IEEE Trans. on Mag., vol. 25, No. 5, Sep., 1989, pp. 3689–3691.

*Primary Examiner*—Carl E. Hall
*Attorney, Agent, or Firm*—Baker, Maxham, Jester & Meador

[57] ABSTRACT

An integral combination magnetic transducer and suspension assembly suitable for use in both contact recording and in winchester-type applications is described. A generally rectangular elongate flat suspension member includes a ring-type inductive read/write transducer formed integrally with the suspension member and is embedded in one end of the suspension member. The ring-type inductive transducer is suitable for horizontal recording applications. The transducer magnetic poletips and magnetic gap are formed and positioned such that the poletips and gap are essentially co-planar with the air bearing surface of a slider-shaped protrusion extending from the lower surface of the end of the suspension member adjacent a moving media during operation. The air bearing surface presented to the disk has most of its area covered with a wear layer to minimize wear of the slider surface and poletips.

24 Claims, 8 Drawing Sheets

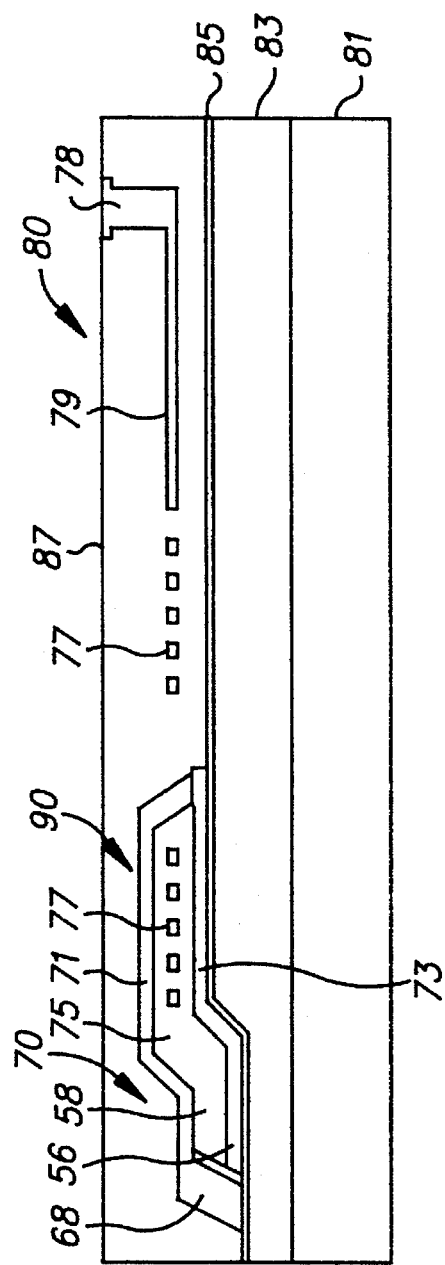
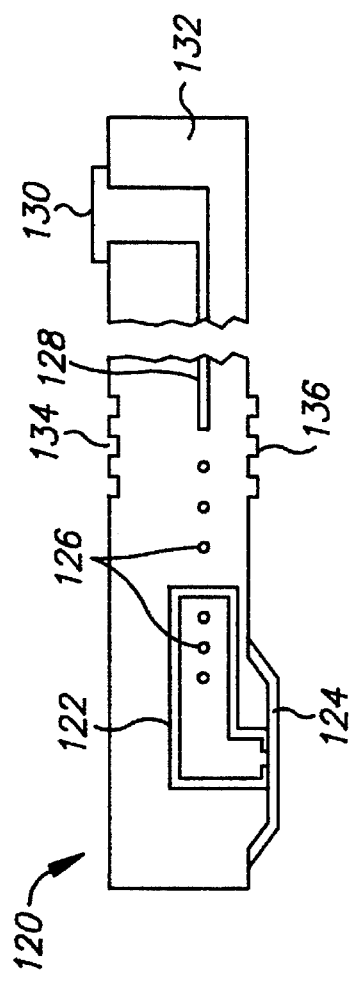

METHOD OF MAKING INTEGRAL TRANSDUCER-SUSPENSION ASSEMBLIES FOR LONGITUDINAL RECORDING

This application is a continuation of application Ser. No. 08/002,290, filed Jan. 8, 1993, now abandoned.

CROSS-REFERENCE TO RELATED U.S. PATENTS

Hinkel et al, U.S. Pat. No. 4,624,048, issued on Nov. 25, 1986 and assigned to the assignee of the present invention, to show a process for making magnetic head sliders useful with the present invention.

Jacobs, U.S. Pat. No. 4,251,841, issued on Feb. 17, 1981 and assigned to the assignee of the present invention, to show a wafer-substrate material useful with the present invention.

Cuzner, et al, U.S. Pat. No. 3,849,800, issued on Nov. 19, 1974 and assigned to the assignee of the present invention, to show a rotary actuator useful in a drive using the present invention.

Watrous, U.S. Pat. No. 4,167,765, issued on Sep. 11, 1979 and assigned to the assignee of the present invention to show a suspension system useful with the present invention.

The above U.S. patents are incorporated by reference herein.

BACKGROUND OF THE INVENTION

1. Field of the Invention

The present invention relates generally to moving magnetic storage devices and their recording elements and more particularly to transducer-suspension structures which are suitable for batch fabrication and a method for making the structures.

2. Description of the Related Art

Moving magnetic storage devices, especially magnetic disk drives, are the memory device of choice. This is due to their expanded non-volatile memory storage capability together with a relatively low cost. Accurate retrieval of the stored memory from these devices becomes critical, requiring the magnetic transducer to be positioned as close to the media as possible. Optimally, the transducer should actually touch the media.

Disk files are information storage devices which utilize at least one rotatable magnetic media disk with concentric data tracks containing data information, a read/write transducer for reading the data from or writing the data to the various tracks, a slider for holding the transducer adjacent to the track generally in a flying mode above the media, a suspension for resiliently holding the slider and the transducer over the data tracks, and a positioning actuator connected to the transducer/suspension combination for moving the transducer across the media to the desired data track and maintaining the transducer over the data track center line during a read or a write operation. The transducer is attached to the air bearing slider which supports the transducer above the track of the disk by a cushion of air that is generated by the rotating disk. Alternatively, the transducer may also operate in contact with the disk. The suspension provides desired slider loading and dimensional stability between the slider and the actuator arm. The suspension is required to maintain the transducer and the slider adjacent to the data surface of the disk with as low a loading force as possible. The actuator positions the transducer over the correct track according to the data desired on a read operation or to the correct track for placement of the data during a write operation. The actuator is controlled to position the transducer over the correct track by shifting the combination generally transverse to the direction along the track.

In conventional disk drives, the transducer and the slider are formed separately from the suspension and then attached through a manual, operator controlled precision operation. Typically, these components are small and the positioning of each relative to the other must be exact. During operation, the transducer must be exactly positioned relative to the data track, which in turn means that the suspension must be exactly positioned onto the slider. The suspension must provide flexibility to pitch and roll motion for the slider relative to the direction of motion of the rotating disk and yet also provide resistance to yaw motion. Any error in the placement of the suspension relative to the slider may result in the destruction of both components. Even if the suspension and the slider are correctly positioned, electrical conductor leads to the transducer must then be connected to the transducer. The conductor leads are directed along the suspension and connected to an amplifier placed on the suspension or on the actuator. The conductor leads must not add to the spring stiffness of the slider while providing good electrical interconnection. The conductor leads are generally bonded by soldering or ultrasonic bonding, for example, to both the transducer output terminals and the amplifier by an operator. Again, errors can cause destruction of the entire combination. Touching the media presents unique problems in wear and, during operation of the disk file, the possibility of creating a "crash" of the media. To reduce the wear problem and "crash" potential, it has been recognized that the mass of the suspension system must be reduced to a minimum. Minimal mass optimizes any physical "impact" the head has upon the media and thereby reduces the possibility of damage and wear.

To this end there have been disclosed a variety of mechanisms which utilize a "reed" approach to producing the transducer-slider-suspension. Structured to work in a perpendicular recording environment, these devices permit the head and suspension to be easily manufactured laving: (i) precise throat height control, (ii) precise formation of air bearings to achieve specified flying heights, (iii) bonding of sliders to suspensions, and, (iv) easy routing of conductor leads.

U.S. Pat. Nos. 5,041,932; 5,073,242; and 5,111,351 entitled "Integrated Magnetic Read/Write Head/Flexure/Conductor Structure" granted to Harold J. Hamilton disclose an integral magnetic transducer/suspension/conductive structure having the form of an elongate dielectric flexure or suspension body with a magnetic read/write transducer embedded within at one end thereof. In a preferred embodiment, Hamilton discloses an elongate, dielectric flexure body of aluminum oxide having a magnetic pole structure and helical coil integrally formed at one end of the flexure body with embedded copper conductor leads running the length of the flexure body to provide electrical connection for the transducer. The integral structure is fabricated utilizing conventional vapor deposition and photolithography techniques. The integral transducer/suspension structure disclosed by Hamilton may be used in a contact recording system or in a system where the transducer flies above the storage medium on a cushion of air.

As noted earlier, contact recording permits higher signals and greater resolution unregulated by variations in flying height. Unfortunately, the wear associated with contact recording is usually not acceptable. Still another disadvantage is the requirement, in a perpendicular head, of two perpendicular planes which create processing problems. All of this has made the prior art perpendicular recording head unsuitable for high density recording.

SUMMARY OF THE INVENTION

It is therefore a primary object of the present invention to provide an enhanced magnetic moving storage device having a head structure that includes an enhanced transducer configuration.

It is another object of the present invention to create a head-suspension structure which is suitable for longitudinal recording.

It is another object of the present invention to make such a longitudinal head resistant to wear and to variations in air bearing contours.

Still another object of this invention is to create a longitudinal head which is suitable for batch processing in planes parallel to the surface of the initial wafer or substrate.

It is a further object of this invention to produce a suspension system which allows anisotropic stiffening and shaping for maximum actuator bandwidth.

The present invention provides a combination suspension and transducer magnetic head for use with longitudinal recording media which can be used for contact recording as well as for flying above the media. Preferably a release layer is first deposited on a substrate and then individual thin film layers of the transducer are deposited. The coils are horizontal with a vertical or almost vertical second pole piece relative to the first pole piece. The backgap is displaced horizontally from the poletips. The transducers are deposited on a wafer in rows and columns. The suspension layers are then deposited on the transducer rows again preferably on release layers between the suspension layers and the substrate. The substrate is removed by attacking the release layers to leave a combination suspension and transducer produced by batch fabrication.

The horizontal head is fabricated with sidewall gap technology. The suspension is preferably created by deposited alumina and is formed by etching the alumina into the desired shapes followed by separating the alumina from the substrate surface. Removal of the completed reed assembly from the substrate is preferably accomplished utilizing a release layer.

Additionally, the planar deposition arrangement for the present invention permits all processing of the head and the suspension to be performed on a wafer surface. This allows batch production of the head and the suspension as one unit.

Still another advantage of the present invention is the use of wear resistant material on the head structure. This protects the poletip regions of the head and may be localized through patterning of the suspension surface to create a favorable air bearing loading condition for the head and suspension.

BRIEF DESCRIPTION OF THE DRAWINGS

The foregoing, and other objects, features and advantages of the invention will be apparent from the following more particular description of preferred embodiments of the invention, as illustrated by the accompanying drawings, wherein:

FIG. 7 is a cross-sectional view showing the various process layers utilized in the production of an embodiment of the invention;

FIG. 10 is a side view of a another preferred reed assembly composed of a longitudinal transducer head and suspension incorporating the poletip design shown in FIG. 5A.

DESCRIPTION OF THE PREFERRED EMBODIMENT

The preferred embodiments of the present invention are preferable for use in high density direct access storage devices such as found in large information storage systems as well as in the single disk files typically used in personal computers. The devices, e.g., disk drives or files, may use magnetic memory disks as the media.

Figure 1:
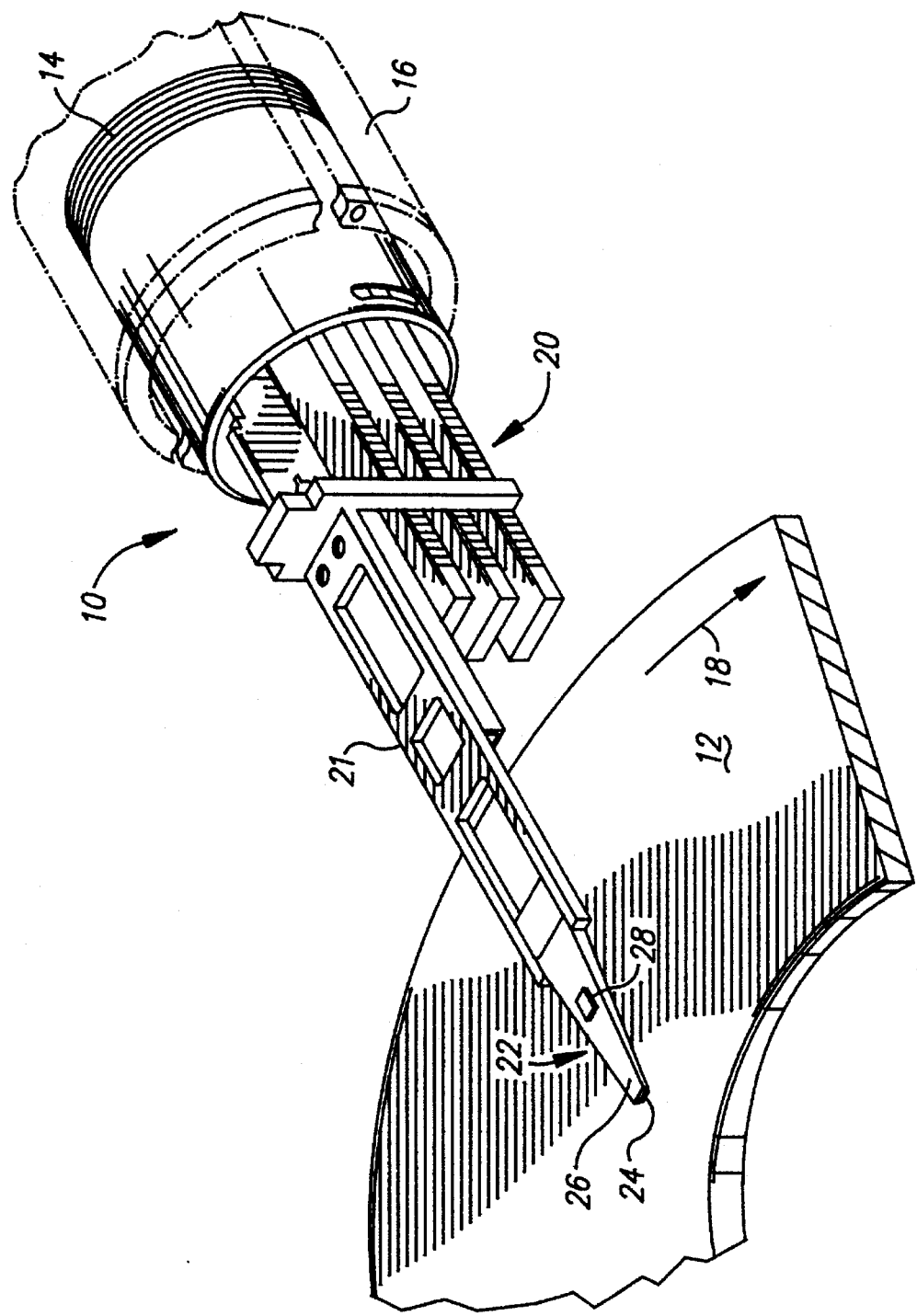
FIG. 1 is a perspective view of a combination reed assembly according to the present invention attached for positioning by a linear actuator in transducing relationship to a disk surface of a disk file.

Referring now to FIG. 1, a linear actuator 10 and a segment of an associated disk 12 of a data recording disk file is shown. The linear actuator 10 includes a voice coil motor, which comprises a coil 14 movable within the magnetic field of a fixed permanent magnet assembly (not shown). The magnet assembly includes a core within the coil 14 and an outer structure supported by a housing 16. One end of an actuator arm 20 is attached to the movable coil 14. Attached to the other end of the actuator arm 20 is a plurality of support arms 21, each of which support a combination transducer-slider-suspension reed assembly 22 produced according to the procedure set forth herein. The combination assembly 22 includes a suspension section 26 and transducer-slider 24 formed at one end integral with the suspension section 26. The suspension section 26 supports the transducer-slider 24 above the surface of the disk 12 on a bearing or cushion of air generated by the rotation of the disk 12. Alternatively, the suspension section 26 may support the transducer-slider 24 in contact with the disk media 12. The air bearing or air bearing surface (ABS) refers to the surface of the slider parallel to and adjacent the disk surface. It includes both configurations where the slider is designed to fly above the disk, sometimes referred to as a winchester-type drive, and where the slider is designed to contact the recording media, the disk 12, during operation.

The actuator arm 20 includes a plurality of the arms 21 with each arm 21 supporting the combination reed assembly 22, each combination assembly 22 associated with each surface of the disk 12. Therefore, disk 12 also has a combination assembly 22 mounted to an arm 21 of the actuator arm 20 on the underside of the disk 12. Further, other combination assemblies are associated with the top and bottom sides of other disks, the transducer access of which is controlled by the actuator 10.

The suspension section 26 of the combination transducer-slider-suspension assembly 22 provides a load to the transducer-slider 24 which is generally perpendicular to the surface of the disk 12. This perpendicular load maintains the transducer-slider assembly 24 in contact with the data surface of the disk 12 when the disk 12 is not in rotation. During operation of the disk drive a lifting force is generated between the transducer-slider 24 ABS and the rotating disk 12 opposing the perpendicular load applied to the transducer-slider 24 causing the transducer-slider 24 to fly above the disk surface. Alternatively, in contact recording, during rotation of the disk 12, the transducer-slider 24 remains in contact with the media for reading or recording data.

During operation, the transducer-slider 24 is moved to the desired track of the plurality concentric data tracks defined on the data surface of the disk 12 by means of the coil 14. The coil 14 is controlled by positioning signals to move within the magnetic field of the magnet assembly. Because it is desired to provide rapid access of the transducer-slider 24 from one track to another track for read or write operations, it is necessary that the transducer be properly positioned over the desired track and reach that track in a minimum amount of time. It should be noted that while the actuator 10 illustrated in FIG. 1 is a linear actuator which moves the combination assembly 22 in a precise direction transverse to the data tracks, other types of conventional disk files utilize a rotary actuator such as is shown in the aforementioned U.S. Pat. No. 3,849,800 and in FIG. 2 herein. The combination reed assembly 22 must provide radial stiffness, and have substantial flexibility in the pitch and roll directions as it rides above the data surface of the disk 12. If desired, an integrated circuit amplifier assembly 28 may also be produced on the suspension section 26 of the combination assembly 22.

Figure 2:
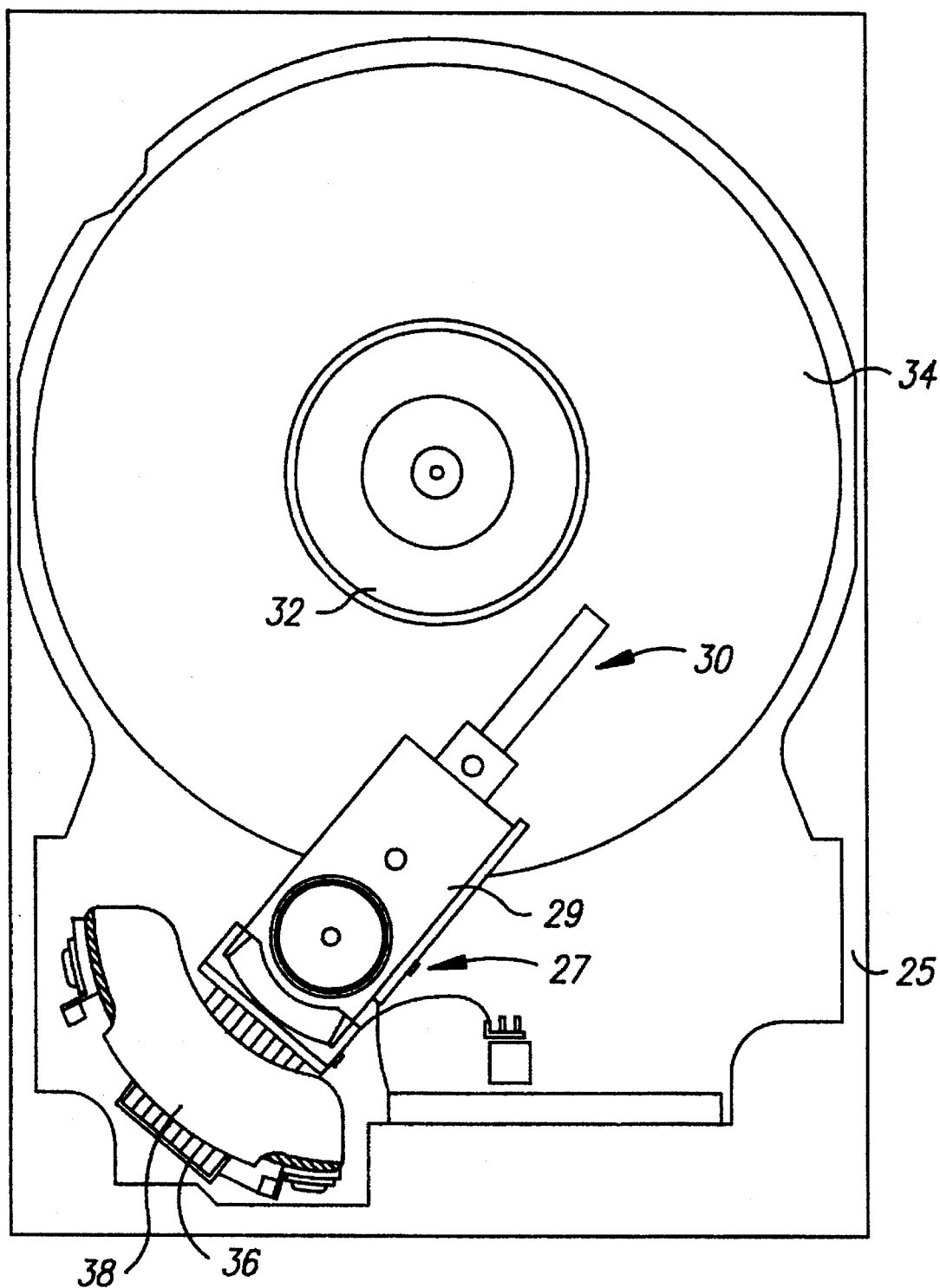
FIG. 2 is a top view of a magnetic recording mechanism with a rotary actuator and employing the reed assembly according to the present invention.

Referring now to FIG. 2, a data recording disk file including a housing 25 in which is mounted a rotary actuator 27, an associated disk 34 and a drive means 32 for rotating the disk 34 is shown. The rotary actuator 27 moves a combination reed assembly 30 of the present invention in an arcuate path over the disk 34. The rotary actuator 27 includes a voice coil motor, which comprises a coil 36 movable within the magnetic field of a fixed permanent magnet assembly 38. An actuator arm 29 is attached to the movable coil 36. The other end of the actuator arm 39 is attached to the combination transducer-suspension assembly 30 of the present invention produced according to the procedure set forth herein.

Figure 3A:
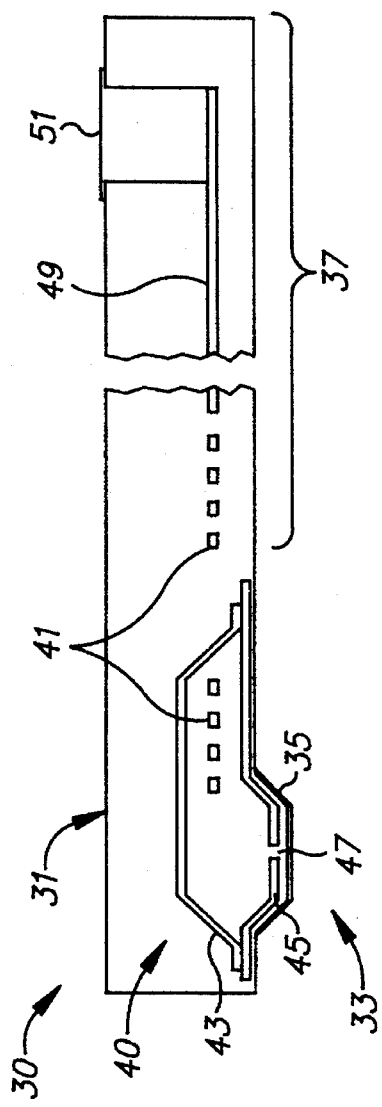
FIG. 3A is a cross-sectional view of the preferred embodiment of a combination reed transducer/suspension assembly according to the present invention.
Figure 3B:
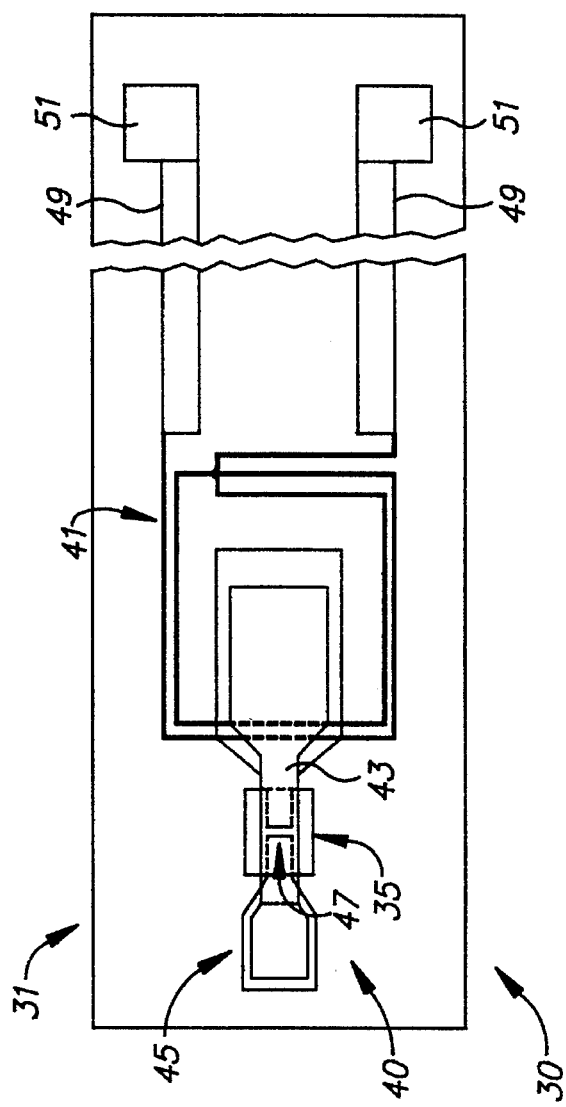
FIG. 3B is a top plan view of the reed assembly shown in FIG. 3A.
Figure 4A:
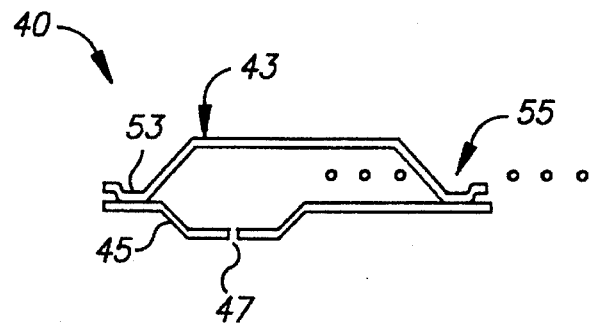
FIG. 4A is a cross-sectional view of the poletip design incorporated in the reed assembly shown in FIGS. 3A and 3B.
Figure 4B:
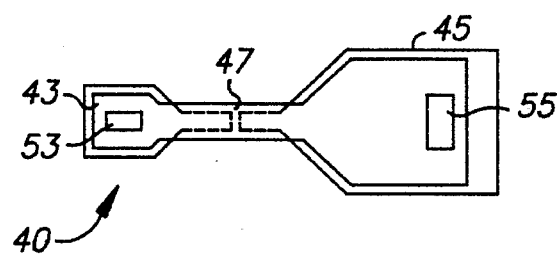
FIG. 4B is a top plan view of the poletip design shown in FIG. 4A.

Referring now to FIGS. 3A, 3B, 4A and 4B, a preferred embodiment of the combination suspension/transducer-slider reed assembly according to the principles of the present invention is illustrated. The combination suspension/transducer-slider structure 30 comprises an elongated generally rectangular body of a dielectric material such as aluminum oxide ($Al_2O_3$) or silicon dioxide ($SiO_2$), for example, having a relatively uniform thickness along most of its length forming a suspension section 37 and a somewhat greater thickness at one end, the left hand end as shown, wherein a magnetic read/write transducer or head 40 is formed and a slider air bearing surface (ABS) is patterned on a lower side thereof. As mentioned above, the term ABS refers to the side of the slider which is generally parallel to and adjacent the media surface in both winchester-type disk files and contact recording applications. As shown in FIG. 3A, the ABS comprises a shaped protrusion 33 formed on the lower side of the reed assembly body 31, preferably forming a contact pad for contact recording applications. Alternatively, the shaped protrusion 33 can form a slider having an ABS patterned to generate a lifting force when relative motion exists between the reed assembly 30 and the media to allow the slider to fly closely above the media surface. The surface of the shaped protrusion 33 is coated with a wear layer 35 of suitable material, such as diamond-like carbon, for example, to minimize wear and damage when the reed assembly contacts the media surface. Although protrusion 33 as shown in the figures comprises a simple structure, other embodiments of the present invention can include a multiple-stepped protrusion which allows the wear layer 35 to continue to provide wear protection to the slider surface even after the magnetic yoke poletips have been exposed at the ABS, either by wear or by a brief post-fabrication lapping process intended to reduce the magnetic separation between the head and the disk surface caused by the thickness of the wear-resistance layer in the pole tip region.

The read/write head 40 is formed integrally with the suspension section 37 to provide the combination reed assembly 30. In the preferred embodiment, the read/write head 40 comprises a ring-type head utilized in horizontal recording applications, but can alternatively comprise a probe-type head for perpendicular recording applications. The read/write head 40 includes a magnetic circuit comprising an upper magnetic yoke 43 magnetically coupled to a lower yoke 45 at a front stud 53 and a back-gap stud 55. The lower yoke 45 is broken to form a horizontal gap 47 between the two pole pieces formed by the break in the lower yoke 45. The lower yoke 45 is shaped to provide the gap 47 near the surface of protrusion 33 with the poletips substantially co-planar so as to be closely adjacent the recording media. Inductively coupled to the magnetic yoke structure is a horizontal spiral coil 41, with the ends of the coil connecting through lead conductors 49 extending the length of the suspension section 37 to terminal bonding pads 51.

In a preferred embodiment, the combination reed assembly 30 comprises a body 31 of $Al_2O_3$ having a length of 12 millimeters (mm), a width of 0.5 mm and a thickness of 35 micrometers ($\mu$m) for that portion of the body 31 forming suspension section 37 and maximum thickness of 50 $\mu$m for the read/write head section 33. The reed assembly 30 is fabricated utilizing well-known deposition and photolithography techniques on a base substrate, as described in greater detail below, utilizing a release layer to separate the finished reed assembly from the substrate. The upper and lower magnetic yokes 43 and 45 are of nickel-iron alloy (NiFe), generally referred to as permalloy, or other suitable magnetic material, such as iron (Fe), nickel (Ni) and cobalt (Co) or their alloys, and are preferably plated as is well-known in the art. Similarly, the coil windings 41, lead conductors 49 and terminal bonding pads 51 are also formed of copper (Cu) or gold (Au), for example, by plating techniques. Manufacturability of this embodiment is greatly simplified in that the complete reed assembly 30 is fabricated in layers parallel to the supporting substrate by conventional, well-known techniques.

Figure 5A:
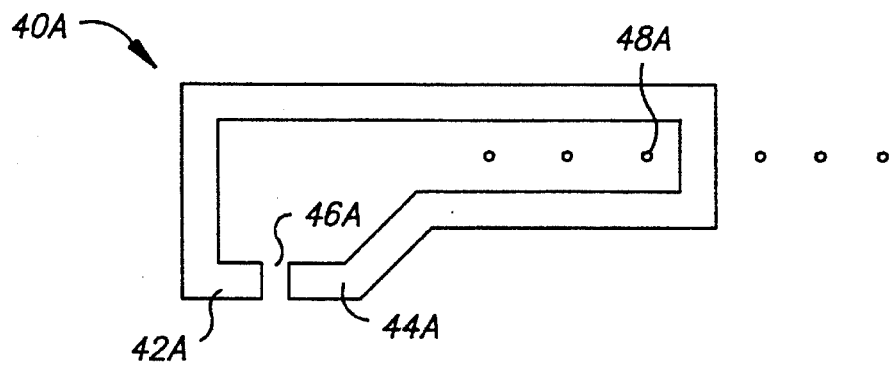
FIGS. 5A and 5B are cross-sectional views of two additional embodiments of poletip configurations designed according to the present invention.
Figure 5B:
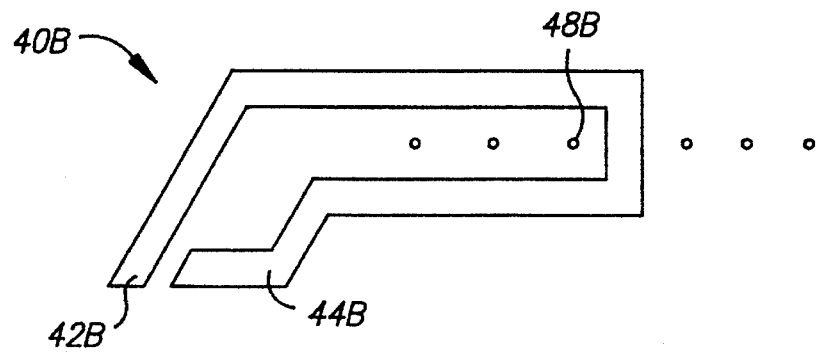

Referring now to FIGS. 5A and 5B, cross sectional views of two further embodiments for the poletip configuration of the present invention are shown. FIG. 5A illustrates one embodiment of a horizontal poletip configuration read/write head 40A. This embodiment is fabricated using a free standing side wall technique such as described by Lazzari et al., "A New Thin Film Head Generation I.C. Head," IEEE Transactions on Magnetics, Volume 25, No. 5, page 3190, 1989. Pole pieces 42A and 44A are spaced apart by a magnetic gap 46A. This permits the horizontal head 40A to read and write magnetic signals and to communicate these signals via coils 48A to circuitry (not shown) of its associated disk drive.

In a similar fashion, the horizontal head 40B shown in FIG. 5B utilizes pole pieces 42B and 44B separated by a gap 46B. Horizontal head 40B communicates via coils 48B. The pole piece 42B is slanted and can be fabricated without the use of a free standing sidewall such as required for the embodiment shown in FIG. 5A.

Figure 6A:
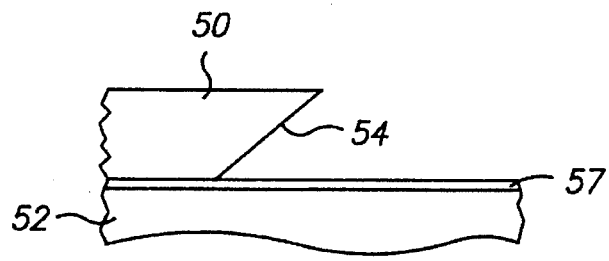
FIGS. 6A–6F are cross-sectional views illustrating the processing steps involved in the manufacture of one embodiment of the invention incorporating the poletip design shown in FIG. 5B.
Figure 6B:
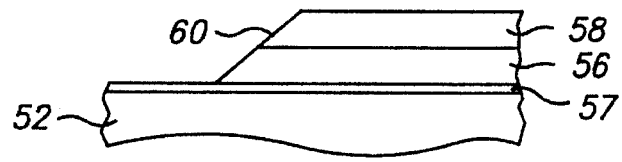
Figure 6C:
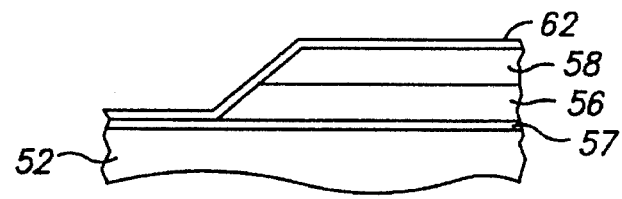
Figure 6D:
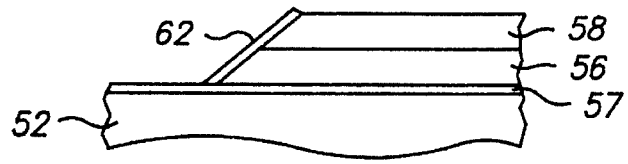
Figure 6E:
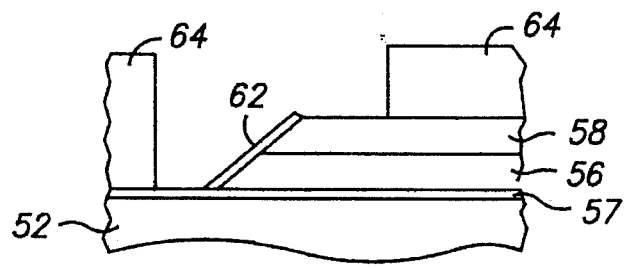
Figure 6F:
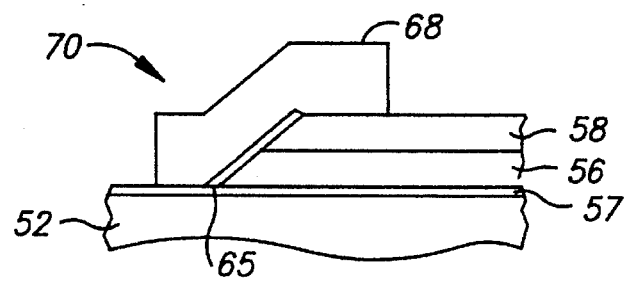

FIGS. 6A–6F are cross-sectional views illustrating the processing steps involved in the fabrication of a preferred embodiment of the present invention incorporating the horizontal head shown in FIG. 5B. A seed layer 57 is first deposited by sputter deposition, for example, on the substrate 52. The next step is the deposition of a layer of photoresist 50 onto the substrate 52 over the seed layer 57 and then etching or otherwise forming a resist pattern having a slope 54. The substrate 52, as shown, represents a substrate and release layer as described in greater detail with reference to FIG. 7 below. A first pole piece layer 56 of NiFe, for example, and a separation layer 58 of copper (Cu), for instance, are deposited onto the seed layer 57, as is shown in FIG. 6B. The separation layer 58 provides separation between the two pole pieces of the head. The only requirement for the separation layer 58 is that it be of a non-magnetic material. The slope 54 of the resist pattern causes the layers 56 and 58 to be formed with a slope 60. Preferably the first pole piece layer 56 and the Cu layer 58 are sequentially plated onto the substrate 52. A layer 62 of a magnetic gap material is then deposited over the layers 56 and 58 after the resist pattern of the photoresist 50 is removed as is shown in FIG. 6C. FIG. 6D shows that the unneeded material of the magnetic gap layer 62 is then removed through a resist mask and etch step, for example (not shown), to provide a gap layer 62 covering only the slope 60 (see FIG. 6B) of the layers 56 and 58. A photoresist pattern 64 for deposition of the second pole piece is then provided as is shown in FIG. 6E. A layer of NiFe, for example, is then deposited, again preferably by plating, and the resist pattern 64 removed to form a second pole piece 68 as is shown in FIG. 6F. The first pole piece layer 56 determines the throat height for the resultant poletip structure 70, as is shown in FIG. 6F. The poletip structure 70 comprises a first pole piece formed by the NiFe layer 56 and a second pole piece formed by the NiFe layer 68 having a gap therebetween formed by the gap layer 62. The separation layer 58 thickness is determined by the minimum required separation distance between the first pole piece formed by NiFe layer 56 and the later deposited second pole piece 68. While FIG. 6F illustrates the gap layer 62 slanted at the angle formed by slope 60, the slanted gap layer is not restricted to the slope as shown. That is, the slope of the slanted gap layer can be at any angle between 90 degrees, i.e., perpendicular and ±70° with respect to the plane of the substrate 52.

An important consideration in the process shown in FIGS. 6A–6F is the material utilized for seed layer 57 required for the deposition of both pole piece layers 56 and 68. Preferably a plating process is used and a single seed layer 57 can be used for plating both pole pieces. However, if the seed layer material used is magnetic, it must not be present in the magnetic gap 65 to prevent magnetically shorting the gap 65. If the seed layer is non-magnetic and deposited over the magnetic gap 65 and is greater than a fraction of a microinch, it generally should be removed to minimize the magnetic head/disk separation. If the non-magnetic seed layer is of a material suitable for use as a wear layer, the need for deposition of a separate wear layer can be eliminated.

Referring now to FIG. 7, a cross-sectional view illustrating the various process layers utilized in the fabrication of a preferred embodiment of the present invention is shown. One objective of the present invention is to fabricate horizontal type heads and encapsulate these heads in a suspension structure fabricated by thin film deposition of a dielectric material, such as $Al_2O_3$ (alumina), for example. The suspension shape is patterned around the horizontal head using conventional etching techniques well known to those in the art. The completed head and suspension assembly is separated from the substrate using a release or sacrificial layer between the substrate and dielectric suspension material. All processing is performed in planes parallel to the wafer substrate surface.

With continuing reference to FIG. 7, a process carrier substrate 81 can be of any suitable material known to those in the art, such as alumina-titanium-carbide (AlTiC) or silicon, for example. A sacrificial or release layer 83 is then formed on the substrate 81. The release layer 83 serves several purposes. The release layer 83 is the sacrificial layer which is eventually dissolved to free the finished suspension-transducer assembly 80 from the substrate 81. The release layer 83 can also be patterned to shape a subsequently deposited wear layer. The release layer 83 can, for instance, be an electrically conductive material and thereby serve as a seed or plating base layer for the subsequent layers deposited utilizing plating techniques, such as the pole pieces of the transducer. Likely candidates for the release layer 83 are NiFe or Cu which could be deposited through a sputtering or plating process. A barrier layer 85 is then formed over the release layer 83.

The barrier layer 85 similarly serves several functions in the production process. The barrier layer 85 is used to isolate the subsequently deposited layers from the release layer 83. For instance, the magnetic poletip structure 70 and head 90 formed as described with reference to FIGS. 6A to 6F can be the subsequently deposited layers. Thus pole pieces 71 and 73 of FIG. 7 can be formed in the same manner as discussed for the pole pieces 68 and 56, respectively, of FIGS. 6A–6F. The barrier layer 85 serves as an etch stop to protect the pole pieces from any etchant which may be later used to dissolve the release layer 83. Additionally, the barrier layer 85 may be used as the seed layer for plating of the pole pieces 71 and 73, as described above, for example. Even more, the barrier layer 85 may be used as a wear layer to protect the pole pieces during operation in close proximity to a rotating magnetic media. In this capacity, it is preferable that the barrier layer 85 be an electrically conductive material which could assist in promoting a longer lifetime in a contact recording mode. If the barrier layer 85 is not to be used also as a wear layer, it is desirable to remove it after the release layer 83 is dissolved.

A thin film deposition process for fabrication of the pole piece structure 70 utilized in the embodiment shown in FIG.

7 has been described with reference to FIGS. 6A–6F. While the described process only concerned the formation of the poletips and the magnetic gap therebetween, it is understood by those skilled in the art fabrication of the poletip structure 70 is not an isolated process, but is integrated with the fabrication of the entire magnetic head 90. For example, the entire lower pole piece or lower yoke 73 is typically formed in one plating operation rather than just forming the lower poletip 56 and later forming the remainder of the lower yoke 73. On the other hand, because of various difficulties well-known in the art which can be encountered during its fabrication, the upper poletip 68 is formed in a separate plating step and the remainder of the upper pole piece or upper yoke 71 plated and "stitched" to the upper poletip 68 in a subsequent process step after the coil windings 77 and lead conductors 79 have been formed. Alternatively, the entire upper pole piece 71 including poletip 68 can be placed in a single process step subsequent to the plating of the coil windings 77 and lead conductors 79. Similarly, the formation of the dielectric layer 75 including the separation layer 58 in which the coil windings 77 are embedded can be accomplished in a single step or series of steps prior to the plating of the upper poletip 68. However, if a non-magnetic electrical conductive material such as Cu is utilized as the separation layer 58, it will be necessary to form the dielectric layer separately because the coil windings 77 must be embedded in an insulating material.

When fabrication of the transducer 90 is complete, a layer of a suitable dielectric material, such as alumina, for example, is deposited over the magnetic transducer 70 to provide the transducer suspension assembly 80 to support the transducer 70 in sensing relationship with the magnetic media (as shown in FIGS. 1 and 2). The suspension section 87 includes coil turns 77 and associated conductor leads 79 embedded in the layer or layers that form the suspension section 87. Contact studs 78 are formed in the suspension section 87 at the external termination points of the conductors 79 at the end opposite the transducer 90.

Preferential aspects of the present invention are the use of an electrically conductive release layer 83 as the primary seed layer, with possibly a thin electrically conductive barrier layer 85 on top to provide a wear layer for the completed poletip structure 70. The wear layer could thereby be thin without any lapping process. In this embodiment, the pole pieces 71 and 73 are preferably formed by a plated Permalloy process. A light lapping of the pole pieces may be required to insure a planar or level poletip structure 70 from this fabrication process.

Figure 8A:
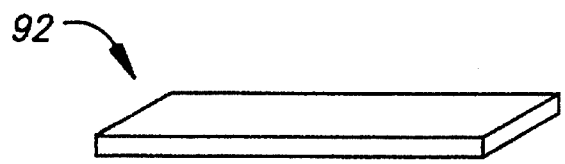
FIGS. 8A–8D are perspective views of the reed assembly of the present invention illustrating various preferred shapes.
Figure 8B:
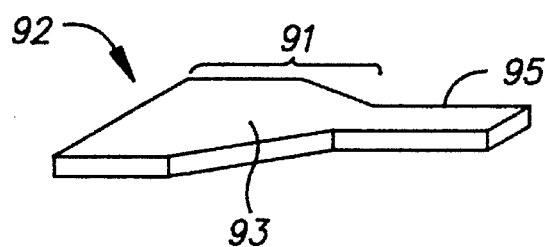
Figure 8C:
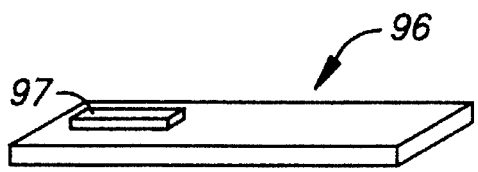
Figure 8D:

Referring now to FIGS. 8A–8D, perspective views of preferred embodiments of the present invention wherein the reed assembly body is fabricated in desired shapes to provide specific suspension characteristics are shown. Since the reed assembly is fabricated on a substrate with thin film technology, it is possible to locally shape and stiffen the suspension. The topographical shape of the suspension system can be as shown in the aforementioned Watrous U.S. Pat. No. 4,167,765 or in any of the other planar view shapes commonly used. The planar shape of the suspension should not be taken as a limiting factor in this invention. In FIG. 8A a reed assembly body 92 comprises an elongate structure having a generally rectangular (parallel piped) shape in which the suspension characteristics are determined primarily by the material and the length, width and thickness of the structure. In FIG. 8B, the reed assembly body 94 comprises a suspension section 91 in which the width of the body is changed to form a trapezoidal section 93 necking down to the transducer section 95. In this embodiment, the suspension characteristics are primarily determined by the change in width between the suspension section 91 and the transducer section 95 and the rate of width change; i.e., the length of trapezoidal section 93. FIGS. 8C and 8D illustrate the reed assembly of FIG. 8A wherein one or more longitudinal ribs 97 or one or more transverse grooves, respectively, have been formed on the upper surface of the suspension section of the reed assembly body 96 and 98, respectively. In these embodiments, the number and dimensions of the ribs 97 or grooves 99, respectively, effectuate selective stiffening or a decrease in the stiffness of the reed assembly suspension.

Figure 9A:
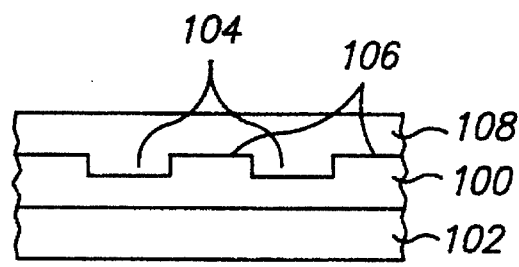
FIGS. 9A–9D are side views illustrating two processing techniques employed to create localized patterning to effectuate local stiffening and Air Bearing Surface (ABS) contouring.
Figure 9B:
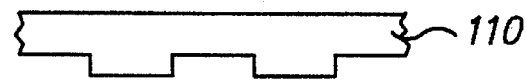

Referring now also to FIGS. 9A and 9B, side views of the reed assembly suspension section illustrating one processing technique employed to create the localized patterning to fabricate a thin film suspension system in a plane parallel to the top plane of the process carrier substrate to effectuate the selective stiffening shown in FIG. 8D is shown. As illustrated in FIG. 9A, a release layer 100 is formed on a substrate 102. The thickness of the release layer 100 is varied locally to provide thinner portions 104 and thicker portions 106 to provide a mold having the desired suspension patterning in reverse relief. This is accomplished, for instance, by plating two layers of the release material. The second layer is patterned by photoresist, or by plating a thick layer of the release material and then locally milling or etching areas of the release layer 100. This approach is also useful for creating the ABS contour mold. A suspension material 108 is deposited onto the release layer 100 mold to selectively vary the thickness of the suspension material 108. The suspension material 108, when separated from the release layer 100, becomes the suspension portion 110 of a thin film transducer-suspension reed assembly as is shown in FIG. 9B.

Figure 9C:
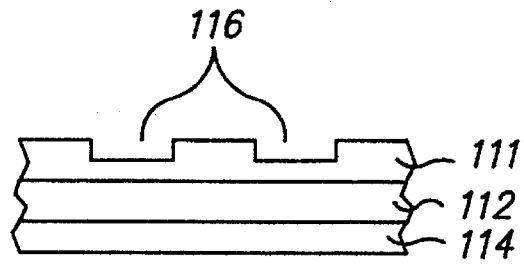
Figure 9D:
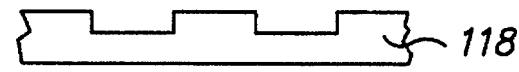

A second approach is illustrated in FIGS. 9C and 9D to locally etch or pattern a layer of suspension material 111 deposited onto a release layer 112. The release layer 112 in formed by depositing a release material onto a substrate 114. The top of the suspension layer 110 is patterned with photoresist and etched at portions 116 to provide a suspension layer that is flexible along its length. The top of the suspension layer is etched at portions 116 while it is still attached to the release layer 112 and the substrate 114. After the release layer 112 is dissolved, a contoured suspension portion 118 is obtained. By using a combination of the techniques shown in FIGS. 9A and 9C, both the top and bottom surfaces of a suspension system can be featured as desired in a batch process. Using the illustrated techniques, suspension structures can be obtained with localized patterning to increase or decrease localized stiffness as well as provide desired air bearing surface contouring.

Referring now to FIG. 10, a side view in section of a transducer-suspension combination assembly 120 incorporating the horizontal transducer shown in FIG. 5A is shown. The assembly 120 includes a horizontal transducer 122 which can be produced according to the side-wall process described by Lazzari referenced herein above. A wear layer 124 and coils 126 can be produced in the same process. Conductor leads 128 and stud pads 130 can be provided as discussed with reference to FIG. 7 along the length of a thin film suspension section 132. The suspension section 132 can include one or more stiffening portions 134 and 136 to support the transducer 122, and a contoured air bearing surface portion 136 which will control the flying height of the transducer 122.

The conductor leads 128 are preferably plated copper. The conductor leads 128 are routed along the suspension structure 132 to the stud pads 130. The conductor leads are configured in a stripline arrangement since the suspension 132 is thin and the stress symmetry required is compatible with a stripline design. The suspension section 132 is preferably produced by depositing alumina or other suitable material onto the release layer of FIG. 9A. Standard stud and pad technology is used to produce the stud pad 130 to complete the thin film head/suspension reed assembly 120. A thick deposition of alumina can be used to ensure complete encapsulation of the transducer 122 followed by a lapping operation to planarize the top surface of the transducer-suspension assembly.

The alumina suspension material is preferably sputtered to a thickness of from 20 to 50 micrometers. The suspension shape is formed by etching the overcoat and undercoat of alumina. After the suspension shape is formed, the release layer is dissolved to free the head/suspension devices for use.

The described head-suspension structure embodiment is suitable for longitudinal recording and is resistant to wear along its poletips and the air bearing surface contours. This structure can be batch processed in planes parallel to the starting wafer surface and allows for anisotropic stiffening for maximum actuator bandwidth. Production of these suspension/transducer assemblies is facilitated since an extensive lap process is avoided.

While the invention has been particularly shown and described with reference to preferred embodiments thereof, it will be understood by those skilled in the art that various changes in form and detail may be made therein without departing from the spirit and scope of the invention. For instance, a transducer may be produced onto the wafer such as is described in U.S. Pat. No. 4,190,872, assigned to the assignee of the present invention. The wafer may be made of material such as is the subject matter of the Jacobs U.S. Pat. No. 4,251,841, entitled "Magnetic Head Slider Assembly" and assigned to the assignee of the present invention. Although the suspension portions of the present invention are preferably composed of sputter-deposited alumina, it is recognized that other methods of deposition may be employed and that other materials may be utilized, including other suitable oxides, nitrides, carbonides, glasses, amorphous carbon, diamond-like carbon or laminated combinations of suitable conducting and insulating materials. The suspension section according to the preferred embodiments could be a dual layer of a polyimide material and a metal layer deposited thereon to provide sufficient resiliency and stiffness as required by a suspension assembly. It should be noted that the suspension assembly could be produced in a single layer if the correct thickness and stiffness were obtained in the single layer. It is also well understood that many electrically conductive materials are available to form the conductive circuitry and the transducer leads. Copper or gold is the preferred conductive material but many others are available as is well known in the art. While air bearing suspensions are discussed herein, the present invention also includes contact recording wherein the air bearing surface is any suitable surface that can be placed in contact with the media during operation. It should also be evident that the linear actuator could be a rotary styled actuator without departing from the present invention.

We claim:

1. A method for fabricating an integral magnetic transducer and suspension assembly comprising the steps of:

forming a release layer on a substrate surface;

forming a barrier seedlayer on said release layer;

forming a first pole piece of a magnetic material on said barrier seedlayer;

forming a magnetic gap layer at a poletip end of said first pole piece on said barrier seedlayer;

forming an isolation layer over said first pole piece, said isolation layer magnetically and electrically isolating said first pole piece;

forming a coil of an electrically conductive material on said isolation layer;

forming a second pole piece of a magnetic material, a poletip end thereof being formed on said barrier seedlayer and adjacent said magnetic gap layer, said poletip ends of said first and second pole pieces, respectively, being disposed in opposing relationship separated by said magnetic gap layer defining a magnetic gap, said first and second pole pieces being magnetically connected at ends remote from said magnetic gap defining a magnetic backgap, said magnetic backgap extending through said coil;

forming a suspension member of a dielectric material, said suspension member including at least one layer of dielectric material covering said second pole piece, said isolation layer and said coil and extending beyond said magnetic backgap; and removing said release layer to release the integral magnetic transducer and suspension assembly from the substrate leaving the barrier seedlayer in place to serve as a wear layer.

2. A method as in claim 1 wherein the step of forming said second pole piece comprises the steps of:

forming said poletip end of said second pole piece;

forming a horizontal component of said second pole piece over a portion of said isolation layer;

magnetically connecting a first end of said second pole piece to said second pole piece poletip end; and forming a backgap stud at an end of said first pole piece remote from said first pole piece poletip, said backgap stud extending through said coil, and magnetically connecting said backgap stud to a second end of said second pole piece.

3. A method as in claim 2 wherein the step of forming said magnetic gap layer includes forming the magnetic gap layer at an acute angle to a longitudinal axis of the first pole piece.

4. A method as in claim 3 wherein the barrier seedlayer is copper.

5. A method as claimed in claim 4 wherein the step of forming the release layer includes forming the release layer with a lower horizontal portion in a pole tip area and an upper horizontal portion in a yoke area of the first and second pole pieces, and a slanted portion which joins the lower and upper horizontal portions.

6. A method of making a magnetic head assembly comprising the steps of:

providing a substrate;

depositing a release layer on the substrate;

depositing a seedlayer on the release layer;

depositing a photoresist layer on the seedlayer;

removing a portion of the photoresist layer to leave an exposed seedlayer portion and leaving a tapered photoresist layer portion which overhangs a portion of said exposed seedlayer portion;

depositing a first pole piece including a first pole tip on the seedlayer with the first pole tip being adjacent the tapered photoresist layer portion;

depositing at least one insulation layer on top of the first pole piece with a forward portion of said one insulation layer being on top of the first pole tip and adjacent the tapered photoresist layer portion;

removing the photoresist layer so that each of the first pole tip and the forward portion of said one insulation layer has a sloping portion, the sloping portion of the first pole piece and the sloping portion of said one insulation layer being contiguous with respect to one other;

forming a gap layer on the sloping portions of the first pole tip and the forward portion of said one insulation layer;

forming a patterned photoresist layer which has a wall which is spaced from and forward of the gap layer so as to leave a portion of said seedlayer exposed between the wall and the gap layer;

depositing at least a pole tip of a second pole piece on the portion of the seedlayer exposed between the wall and the gap layer, on the gap layer and on said one insulation layer; and removing the patterned photoresist layer to leave a pole tip structure which has as throat height which is defined by a thickness of the first pole tip; and dissolving the release layer and leaving the seedlayer.

7. A method as claimed in claim 6 including:

depositing a dielectric layer over the second pole piece, the coil layer and the conductor leads to form a covering and suspension system for previously deposited and formed layers; and forming contact studs in the dielectric layer to make contact with the conductor leads.

8. A method as claimed in claim 6 including:

removing the seedlayer.

9. A method as claimed in claim 6 including:

the wall of the patterned photoresist layer being a vertical wall.

10. A method as claimed in claim 6 including:

the wall of the patterned photoresist layer being a sloping wall.

11. A method as claimed in claim 6 including:

the step of depositing at least a pole tip of the second pole piece including depositing a horizontal component of the pole tip of the second pole piece on said one insulation layer.

12. A method as claimed in claim 6 including:

before the step of depositing at least the pole tip of the second pole piece, depositing at least a first insulation layer on top of the first pole piece, depositing at least one layer of coil windings and conductor leads on top of the first insulation layer and depositing at least a second insulation layer on top of the layer of coil windings and conductor leads, the first and second insulation layers comprising said at least one insulation layer; and the step of depositing at least the pole tip of the second pole piece including depositing a horizontal component of the second pole piece on the second insulation layer in the same step.

13. A method as claimed in claim 6 including:

before the step of depositing at least the pole tip of the second pole piece, depositing at least a first insulation layer on top of the first pole piece, depositing at least one layer of coil windings and conductor leads on top of the first insulation layer and depositing at least a second insulation layer on top of the layer of coil windings and conductor leads, the first and second insulation layers comprising said at least one insulation layer; and after the step of depositing at least the pole tip of the second pole piece depositing a horizontal component of the second pole piece on said second insulation layer so that the remainder of the second pole piece is stitched to the pole tip of the second pole piece.

14. A method as claimed in claim 6 including:

the seedlayer is copper and is not removed.

15. A method as claimed in claim 6 including:

forming all layer portions in a pole tip area narrower in width than all layer portions beyond the pole tip area.

16. A method as claimed in claim 6 including:

the step of depositing the release layer includes forming the release layer with a forward flat portion and a rear flat portion which are joined by a sloping portion, the forward flat portion being lower than the rear flat portion; and the step of depositing the first pole tip including depositing the first pole tip on the forward flat portion; and depositing a substantially horizontal component of the first pole piece over the sloping portion and the rear portion of the release layer.

17. A method as claimed in claim 16 including:

the step of forming the release layer includes forming the release layer with a pattern in a pole tip area which is a reverse image of an air bearing surface for a slider, the slider being the first layer deposited on the release layer in the pole tip area.

18. A method as claimed in claim 17 including:

depositing a dielectric layer over the second pole piece, the coil layer and the conductor leads to form a covering and suspension system for previously deposited and formed layers; and forming contact studs in the dielectric layer to make contact with the conductor leads.

19. A method as claimed in claim 16 including:

the step of depositing at least a pole tip of the second pole piece including depositing a horizontal component of the pole tip of the second pole piece on said one insulation layer.

20. A method as claimed in claim 19 including:

before the step of depositing at least the pole tip of the second pole piece, depositing at least a first insulation layer on top of the first pole piece, depositing at least one layer of coil windings and conductor leads on top of the first insulation layer and depositing at least a second insulation layer on top of the layer of coil windings and conductor leads, the first and second insulation layers comprising said at least one insulation layer; and after the step of depositing at least the pole tip of the second pole piece depositing a horizontal component of the second pole piece on said second insulation layer so that the remainder of the second pole piece is stitched to the pole tip of the second pole piece.

21. A method as claimed in claim 6 including:

the step of forming the release layer includes forming the release layer with a pattern in a pole tip area which is a reverse image of an air bearing surface for a slider, the slider being the first layer deposited on the release layer in the pole tip area.

22. A method as claimed in claim 21 including:

the release layer being NiFe and the seedlayer being Cu.

23. A method as claimed in claim 22 including:

forming all layer portions in the area of the pole tips narrower in width than all layer portions beyond the area of the pole tips.

24. A method as claimed in claim 23 including:
the wall of the patterned photoresist layer being a vertical wall.

* * * * *